(12) United States Patent
Fujita

(10) Patent No.: US 7,650,715 B2
(45) Date of Patent: Jan. 26, 2010

(54) PLANT SHEET AND MANUFACTURING METHOD FOR PLANT SHEET

(76) Inventor: Tomoko Fujita, Okute 195-2, Tottori-shi (JP)

( * ) Notice: Subject to any disclaimer, the term of this patent is extended or adjusted under 35 U.S.C. 154(b) by 329 days.

(21) Appl. No.: 11/975,812

(22) Filed: Oct. 22, 2007

(65) Prior Publication Data

US 2008/0072488 A1    Mar. 27, 2008

Related U.S. Application Data

(63) Continuation-in-part of application No. 10/818,402, filed on Apr. 5, 2004, now abandoned.

(51) Int. Cl.
*A01G 17/00* (2006.01)
(52) U.S. Cl. .................................. 47/1.01 T; 47/56
(58) Field of Classification Search .............. 47/1.01 T, 47/56
See application file for complete search history.

(56) References Cited

U.S. PATENT DOCUMENTS

| | | | |
|---|---|---|---|
| 3,845,584 A | 11/1974 | Mercer | |
| 3,863,388 A | 2/1975 | Loads | |
| 4,471,569 A * | 9/1984 | Ahm et al. | 47/14 |
| 4,972,627 A | 11/1990 | Hori et al. | |
| 5,033,231 A * | 7/1991 | Sakate et al. | 47/56 |
| 5,307,588 A * | 5/1994 | Ullmann | 47/56 |
| 5,759,929 A | 6/1998 | Ikezawa et al. | |
| 5,860,245 A * | 1/1999 | Welch | 47/56 |
| 5,974,735 A | 11/1999 | Behrens | |
| 6,158,168 A * | 12/2000 | Behrens | 47/9 |
| 6,219,965 B1 | 4/2001 | Ishikawa et al. | |
| 6,286,254 B1 | 9/2001 | Obonai et al. | |
| 6,389,745 B1 | 5/2002 | Huh | |
| 6,427,378 B1 | 8/2002 | Obonai et al. | |
| 6,484,442 B1 | 11/2002 | Weder | |
| 6,615,541 B2 | 9/2003 | Weder | |
| 6,701,664 B2 * | 3/2004 | Ahm | 47/56 |
| 6,735,902 B1 * | 5/2004 | Ahm | 47/56 |
| 7,356,964 B2 * | 4/2008 | Ahm | 47/56 |
| 2001/0014383 A1 | 8/2001 | Debaux et al. | |
| 2003/0029084 A1 | 2/2003 | Weder | |
| 2003/0140553 A1 | 7/2003 | Moore | |
| 2004/0060677 A1 | 4/2004 | Huang | |
| 2005/0178056 A1 | 8/2005 | Morrone | |
| 2008/0072488 A1 * | 3/2008 | Fujita | 47/56 |

OTHER PUBLICATIONS

KURALON K-II (product description) Website of Kuraray Co. Ltd. (access date Oct. 19, 2007).
Bemliese (product description) Website of Asahi Kasei Fibers Corporation (access date Oct. 19, 2007).

* cited by examiner

*Primary Examiner*—Francis T Palo
(74) *Attorney, Agent, or Firm*—Husch Blackwell Sanders LLP Welsh & Katz

(57) ABSTRACT

A light-weight plant sheet including plant pieces between a base sheet and a top sheet is able to make growth by tearing the base sheet and top sheet, each having a mesh structure. The top sheet contains a paste to adhere the top sheet to the base sheet and to hold the plant pieces, and such a paste comes out of the fibers of the sheet when wet during the manufacturing process. When the plant sheet is placed on the desired surface, the plant pieces can grow using water and nutrition provided from the surface of the construction site and absorbed by the top sheet and the base sheet.

25 Claims, 8 Drawing Sheets

FIG. 5
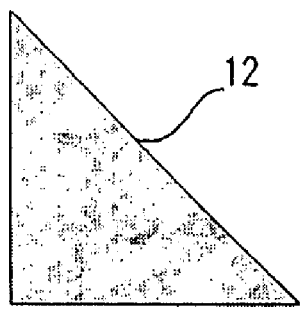
(a)
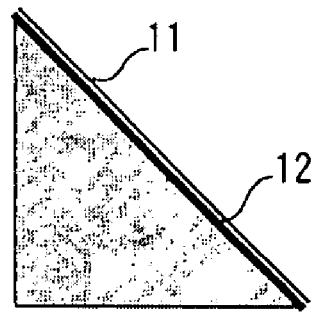
(b)
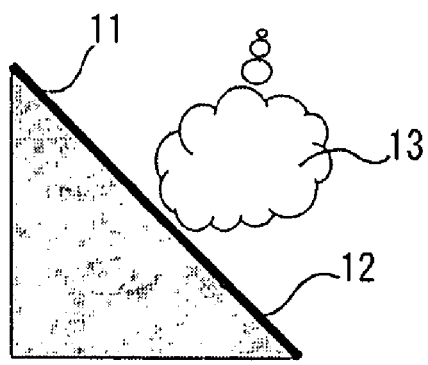
(c)
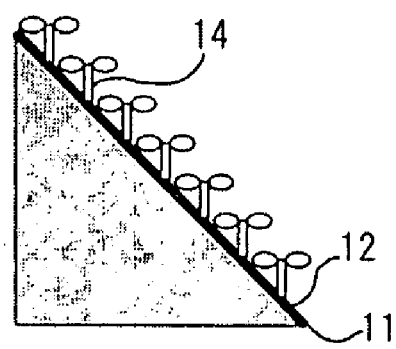
(d)

FIG. 8
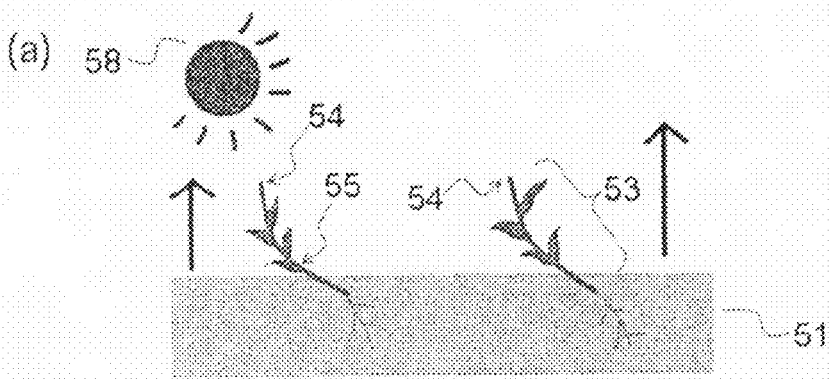
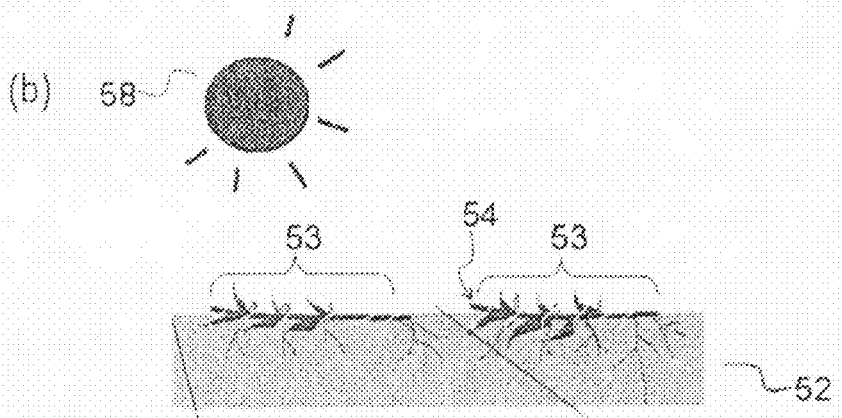
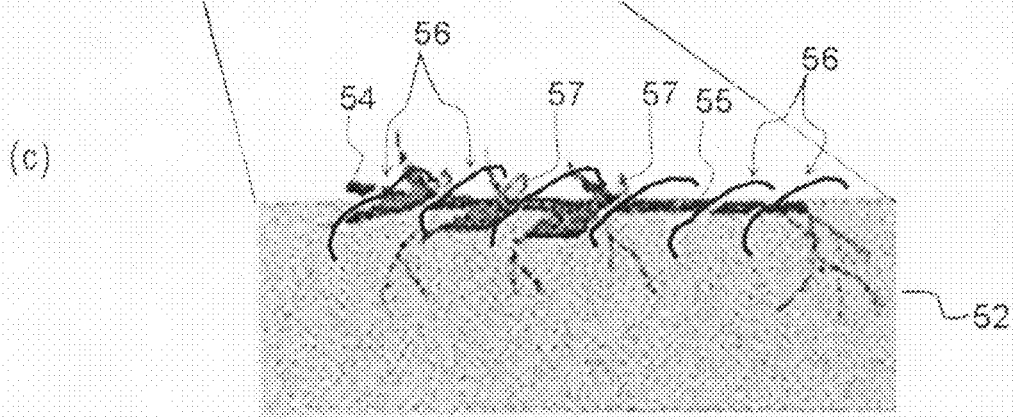

PLANT SHEET AND MANUFACTURING METHOD FOR PLANT SHEET

CROSS-REFERENCE TO RELATED APPLICATIONS

This application is a continuation in part of U.S. application Ser. No. 10/818,402 filed on Apr. 5, 2004.

BACKGROUND OF THE INVENTION

1. Field of the Invention

This invention relates to a plant sheet for covering rock surfaces, concrete surfaces, and bare grounds and a method for manufacturing such a plant sheet.

2. Description of Related Art

Greening provides relaxation from the so-called heat island effects in urban areas, improvements in air environments by direct absorption of $CO_2$ through trees, and habitats for growth and nurturing of various creatures. Because spaces with greens and waters bring natural feelings to human beings, coverage with greens over concrete wall surfaces, soilless rock surfaces, and bare dried grounds provides a more suitable environment for people living thereon. According to recent experiments, a greened surface on the roof of a building generally results in a lower greened roof surface temperature, e.g., about 15 degree Celsius less than that of a comparable concrete roof surface. Additionally, the green roof surface keeps warm during the winter time and cool during the summer time. Greening has a significant impact on a variety of creatures, such as insects and birds that can live well even on a greened roof area of a building, which would otherwise be covered with concrete surfaces.

Greening by incorporation of plants may provide better scenery to not only urban areas but also newly developed areas, undeveloped areas, roads and riversides. When a new road is extended through cutting mountain areas, portions of the area immediately surrounding the road would be soilless rock surfaces and concrete surfaces. Such artificially created surfaces sometimes lack harmony with natural surroundings, but when filled in with plants by greening, such bare grounds and soilless rock surfaces, become desirable green surfaces for regaining the natural harmony.

Plant sheets, tapes, and trays have been known for covering such artificially created surfaces. Plant trays having a depth for keeping soil can be arranged in multiples on a roof to make the roof green. In a typical case, each tray is in a rectangular or square shape and contains soil for growing plants. Such plant trays, however, raise the following problems: First, the plant tray is generally available in a standard size, and when a roof is fully covered with such trays, gaps and open spaces can exist at the edges. Second, partly cut trays can not be used as they are not operable due to the inability to hold soil or water within the cut section of the trays.

There are plant sheets that are of a free size and can fit and mold to any area, because the sheet can be cut according to the dimensions of the area the plant sheet will be attached to. Such a plant sheet also holds the soil from which the plants grow. However, some plant sheets serve only for mulch purposes, or preventing water from overly evaporating and the plants from receiving frost damage. Such a mulch sheet generally does not have germination facilities, and therefore, seeding is required for plant growth in addition to placing the plant sheet on soilless surfaces such as concrete surfaces. Some plant sheets have a soil layer from which germination and cultivation of plants is possible, but addition of a soil layer requires extra manufacturing steps and could increase the price of production. The soil layer in the plant sheet also makes the plant sheet heavier and thicker and therefore makes handling by the operators uneasy.

SUMMARY OF THE INVENTION

It is an object of the invention to provide a plant sheet that can be placed at any surfaces, such as rock surfaces, concrete surfaces, and bare grounds and that can be handled easily by the operators.

It is another object of the invention to provide a manufacturing method for manufacturing such a plant sheet.

The foregoing objects are accomplished by the invented plant sheet for cultivating a plant including a base sheet made of a naturally dissolvable fabric having a mesh structure, a top sheet made of a tearable sheet having a mesh structure and placed on the base sheet, the top sheet being torn by growth of the plant, and a plurality of plant pieces, from which the plant is able to grow, arranged between the base sheet and the top sheet, where the base sheet and top sheet are adhered to one another in an area of contact by a paste.

According to a preferred embodiment of the invention, the top sheet may be constituted of a fabric made of a water-soluble resin material and a biodegradable material, and the water-soluble resin material may work as a paste for making the top sheet and the base sheet adhere to each other. The plant pieces can be made chiefly of leaves and stems of a plant capable of forming adventitious roots. In some cases, the plant pieces are of one or more succulent plants, one or more cacti, or a combination of succulent plants and cacti, and in more particular embodiments, the plant pieces may include one or more sedums.

According to another preferred embodiment of the invention, the top sheet comprises a water-insoluble fiber and a water-soluble resin material. The water-insoluble fiber secures and fastens the plant pieces to the base sheet, while the water-soluble resin material, works as a paste for making the top sheet and base sheet adhere to each other. The presence of a water-insoluble fiber in the top sheet serves to prevent terminal buds of plant pieces from rising upward through the plant sheet due to apical dominance and results in more side stems growing and surviving as plants.

In another aspect of the invention, the above plant sheet includes a net placed between the top sheet and the base sheet for supporting the plant pieces. With the net, the plant pieces can be anchored to the net even after the top sheet and the base sheet are dissolved, so that the plant can grow adequately on a slope.

In still another aspect of the invention, a manufacturing method for a plant sheet comprising the steps of: preparing a base sheet as to spread on a work table; scattering a plurality of plant pieces from which the plant is able to make growth; overlaying a top sheet on the base sheet to sandwich the plant pieces between the top sheet and the base sheet; spraying water on the top sheet to partly dissolve the top sheet and adhere the top sheet to the base sheet; and drying the water contained at the top sheet and the base sheet.

BRIEF DESCRIPTION OF THE DRAWINGS

The above and other objects and features of the invention are apparent to those skilled in the art from the following preferred embodiments thereof when considered in conjunction with the accompanied drawings, in which:

FIGS. 5(a) to 5(d) are process illustrations showing a construction process of the plant sheet of the invention;

FIGS. 8(a) to 8(c) are perspective illustrations showing a conventional plant sheet and the plant sheet according to the invention in response to the effects of apical dominance.

DETAILED DESCRIPTION OF THE PREFERRED EMBODIMENTS

Figure 1:
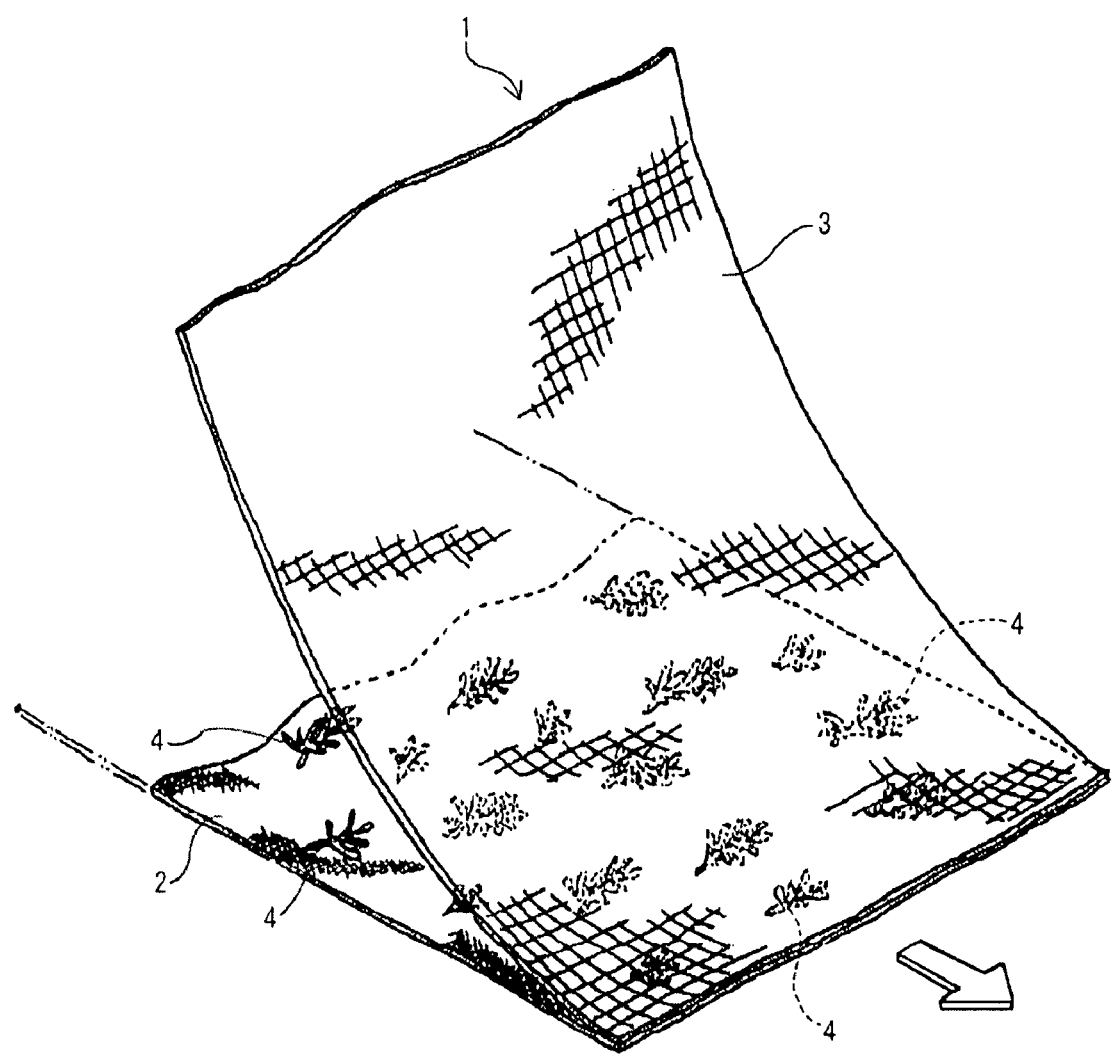
FIG. 1 is a perspective view showing a plant sheet according to an embodiment of the invention.
Figure 2:
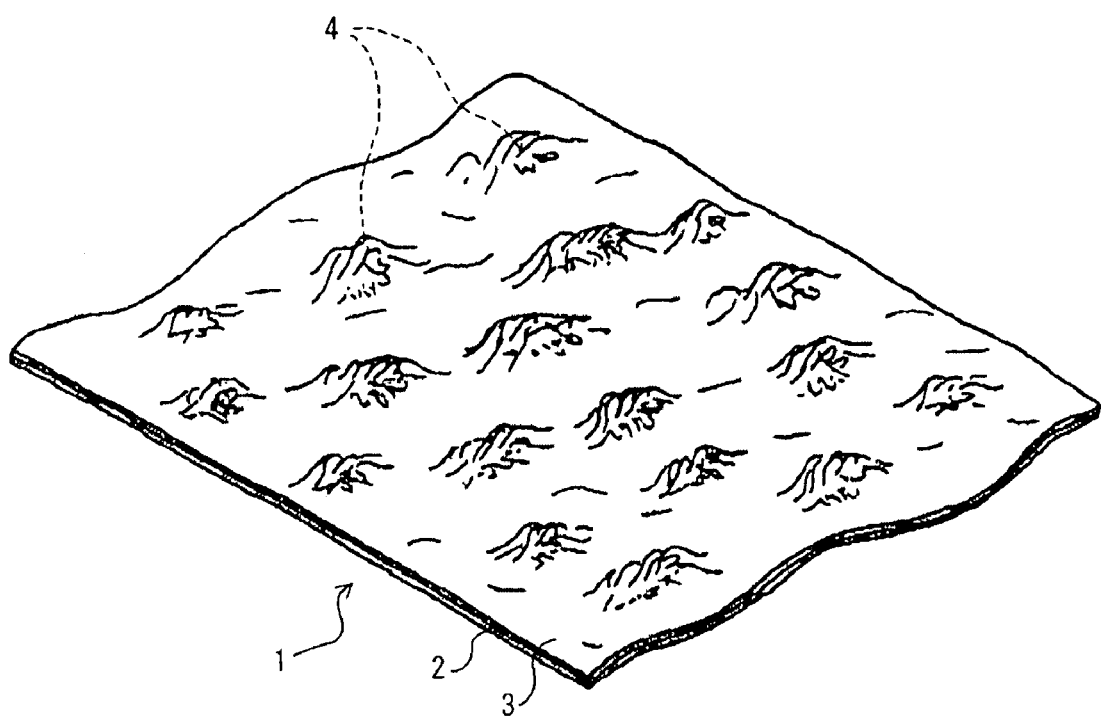
FIG. 2 is a perspective view showing the plant sheet according to an embodiment of the invention.
Figure 3:
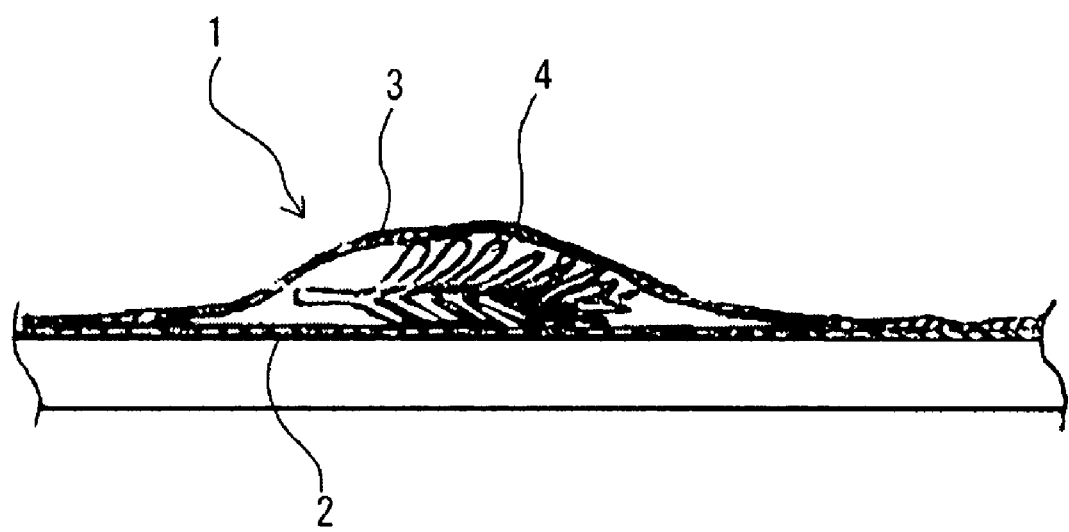
FIG. 3 is a cross section showing the plant sheet according to an embodiment of the invention.

Referring to FIGS. 1 to 3, a plant sheet according to a first embodiment of the invention is described in detail. The plant sheet 1 shown in FIG. 1 is made of a base sheet 2 made of a naturally dissolvable fabric having a mesh structure, a top sheet 3 made of a tearable sheet having a mesh structure and placed on the base sheet 2, and a plurality of plant pieces 4, from which the plant is able to make growth, arranged between the base sheet 2 and the top sheet 3 adhered in an area contact to the base sheet 2 with a paste.

The base sheet 2 is for holding the plant pieces 4 with the top sheet 3 by sandwiching the plant pieces 4 between the base sheet 2 and the top sheet 3. The base sheet 2 also works for adhering the plant sheet 1 to bare grounds or concrete or rock surfaces. In this embodiment, the base sheet 2 is made of a gauze generally used for medical treatments and made of a thin cotton fabric in a plain or leno weave. Such a gauze can absorb fluids adequately among cotton fibers by capillary action and also can be easily dried. According to regulations in Japan, such a gauze is made by plainly weaving a pure cotton thread obtained from seeds of such as e.g., *Gossypium hirsutum* Linne or the like into a fabric and by defatting and bleaching the fabric. Because such a gauze is made from a natural plant, the gauze is generally biodegradable. In addition, such a gauze is soft and matches to any surface shape including undulated, cracked, and partly sloped surfaces, and such a gauze is commercially available easily with a wide width and long length, so that it is easy to manufacture the plant sheet 1 with a larger size to make the product as a mass production. The base sheet 2 has a mesh structure through which the plant's roots grow and anchor into the ground or surface below the base sheet 2. The mesh structure is preferably chosen as to have a relatively rough mesh for allowing the roots to penetrate easily through the base sheet 2. The base sheet 2 also serves as a water supply source, because the base sheet 2 has a capability to absorb water in the form of rain or vapor.

In this embodiment, the base sheet 2 is made of a gauze, but other natural fabric products can be used as the base sheet 2. Examples of other fabric products that can be used as the base sheet 2 include: linen, jute, palm, ramie, a product including a cellulose-based fiber, such as lyocell sold as TENCEL® (Lenzing Fibers, Lenzing, Austria), etc. Preferably the base sheet 2 is a fabric capable of absorbing large amounts of water, such as a cellulosic continuous nonwoven filament product sold as Bemliese™ (Asahi Kasei Fibers, China). The gauze sheet is generally in white, but in this invention, the base sheet 2 can be in any color to match the surrounding thereof. If the plant sheet 1 is settled on a bare ground whose soil is a dark brown, the base sheet 2 can be dark brown to make the sheet blend in visually with the surroundings. If the plant sheet 1 is to be placed on a concrete roof of a building, the base sheet 2 can be in a color of the concrete surface to match the roof color.

The top sheet 3 is for covering the base sheet 2 and plant pieces 4 placed on the base sheet 2. The top sheet 3 is a tearable sheet having a mesh structure made of a woven fiber and is to be torn by growth of the plant pieces. In this embodiment, the top sheet 3 is made of a paper sheet that includes a paste. More specifically, the top sheet 3 is made of a water-soluble, paper based sheet in which a fabric material contains a water-soluble resin material such as starch or PVA. The water-soluble resin material works as the paste when the top sheet 3 is placed on the base sheet 2 and water is supplied over the top sheet 3 during the manufacturing process of the plant sheet 1. Upon receiving the water, the top sheet 3 is dissolved to make the water-soluble resin material come out of the woven fiber. The paste that comes from the water-soluble resin material adheres to the base sheet 2 and to the top sheet 3, securing them together with direct contact there between.

After addition of the water during the manufacturing process and after addition of water upon placement of the plant sheet on the desired surface, the top sheet 3 loses the strength thereof by dissolution of the water-soluble resin material and becomes easily tearable by the growth of the plant pieces 4. In areas where the plant sheet 1 is placed outside buildings or houses, the plant sheet 1 receives rain and moisture according to the weather of the location. Because such rain and moisture makes the top sheet 3 further weakened, the growth of the plants can easily tear the weakened top sheet 3. In addition, the water-soluble resin material operates to firmly adhere the plant sheet 1 to the ground or concrete surface, so that the plant sheet 1 is adequately settled at the place at which the plant sheet 1 is first placed.

The top sheet 3 can be made of other biodegradable materials. Exemplified is a polymer selected from poly(D-lactic acid), poly(L-lactic acid), a D-lactic acid-L-lactic acid copolymer, a D-lactic acid-hydroxycarboxylic acid copolymer, and a blend of two or more polymers thereof. Those lactic based materials also can be mixed with paper material to form a biodegradable sheet suitable for this plant sheet 1. Such biodegradable fibers constituting the top sheet 3 may be formed into non-woven fabric, woven fabric or knitted webs thereby constituting a sheet. Specifically, it is possible to use woven fabric consisting of plain weave, twill fabric, leno weave, twist weave and a combination thereof, weft-knitted fabric, warp-knitted fabric, and laminated non-woven fabric comprising warps and wefts laminated and cemented therein.

Because the top sheet 3 is to be torn by the growth of the plant, the easiness of tearing by the plant may be controlled as varied according to regions, weathers, kinds of plants, situations of the construction sites, seasons of the construction, etc. Tearing the top sheet 3 is properly done after the plant adequately anchors into the surface on which the plant sheet 1 is placed and may be adjusted by blending a relatively durable biodegradable resin into the paper sheet. The paste or glue that comes from the water-soluble resin material may also be adjusted by blending other materials to match to regions, weathers, kinds of plants, situations of the construction sites, seasons of the construction, etc. The top sheet 3 may be colored to match the color of the surface on which the plant sheet 1 is placed. In this embodiment, the top sheet 3 is in green to provide some relaxing feelings to viewers.

The plant pieces 4 are placed between the base sheet 2 and the top sheet 3 and makes growth after the plant sheet 1 is settled at the construction site. The plant pieces 4 are leaves and stems of plants that can grow after the plant sheet 1 is settled at the construction site and have survived, even where no water is supplied, during storage and shipment of this plant sheet 1. The plant pieces 4 may include roots or other portions of the plant having substantial ability to regenerate the plant. The plant pieces 4 are the pieces of the plants that are durable against dryness and can grow without soil. Some plants have such ability to grow without soil under rare water supply even from plants' leaf or stem pieces. Representative plants having such ability are plants belonging to succulents and cactuses, and this invention can utilize cut pieces of leaves and stems of such plants.

The cut pieces 4 of the plants are randomly placed in an equally dispersed manner on the base sheet 2 during the manufacturing process. The size of the plant pieces 4 may be varied and typically from an inch to several inches. The plant pieces 4 are scattered over almost all area of the base sheet 2 except left and right margins where the base sheet 2 is a roll type. In a typical case, the plant pieces 4 are of one kind of plant but plural kinds of plant pieces can be put on the base sheet 2 during the manufacturing process. The plant pieces 4 are sandwiched between the base sheet 2 and the top sheet 3, and are adequately supported by the base sheet 2 and the top sheet 3 because the top sheet 3 adheres to the base sheet 2 by the water-soluble resin material.

The plant sheet 1 does not include any soil with the plant pieces 4, so that the plant pieces 4 are required to have ability to grow from a dried surface where the plant sheet 1 is placed on a roof of a building. Many kinds of plants belonging to succulents and cactuses have good durability against dryness, and survive with a small amount of water absorbed in the base sheet 2 as well as the top sheet 3. *Sedum* is one of the popular plants in Japan and other countries and is a genus of the natural order Crassulaceae, containing about 120 species, native chiefly to the north temperate and frigid regions, and mostly perennial herbs with succulent leaves of varied form, but never compound. The white or yellow, rarely, pink or blue, flowers of *Sedum* are usually small and grouped in cymes. Sedums have a calyx of fine sepals, as many petals, usually ten stamens and five distinct carpels. Sedums can live as colonies on severe rock surfaces, e.g., sea shore and rock hill where no other plant can live and make growth with a very small amount of soil and natural rain water. Exemplified as one kind of Sedums are *Sedum mexicanum* Britt, *Sedum orzifolium, Sedum sarmentosum, Sedum makinoi, Sedum arizoon var-floribundum*, etc.

The plant pieces 4 in the plant sheet 1 can be chosen from many plants according to the regional climate at which the plant sheet 1 is placed. For example, in regions of a relatively cold weather, *Sedum sarmentosum, Sedum makinoi, Sedum arizoon var-floribundum*, and the like can be used because having strength against severe cold weather. In a region requiring strength against salt, *Sedum mexicanum* Britt, *Sedum orzifolium, Sedum arizoon var-floribundum*, etc. are suitable for such a region. The plant pieces 4 for *Sedum* kinds have a relatively light weight, e.g., of 400 g/m$^2$, and with one roll having width one meter and length ten meters, the weight of *Sedum* is very light weight around five kilograms.

With this plant sheet 1, because the plant sheet 1 does not contain any soil, and therefore, the plant sheet 1 is made with a very light weight and easily handled by construction workers. The plant pieces 4 are typically of 400 g/m$^2$ and about 5 kg/sheet, which make the transportation and storage of plant sheet 1 easier. When the plant sheet 1 is set on a building roof, it is not required to reinforce the roof structure. The invented plant sheet 1 can be produced in a shape of a roll suitable for mass production and can be folded as to be easily carried by workers.

The plant sheet 1 is very thin, so that the plant sheet 1 is easily cut at the construction site and can be arranged to fit the site shape on which the plant sheet 1 is to be placed. The kinds of plant pieces 4 can be selected according to region, climate, slope, surface condition, budget, etc., so that the plant sheet 1 can make growth of the plant pieces 4 in almost any area.

Figure 4:
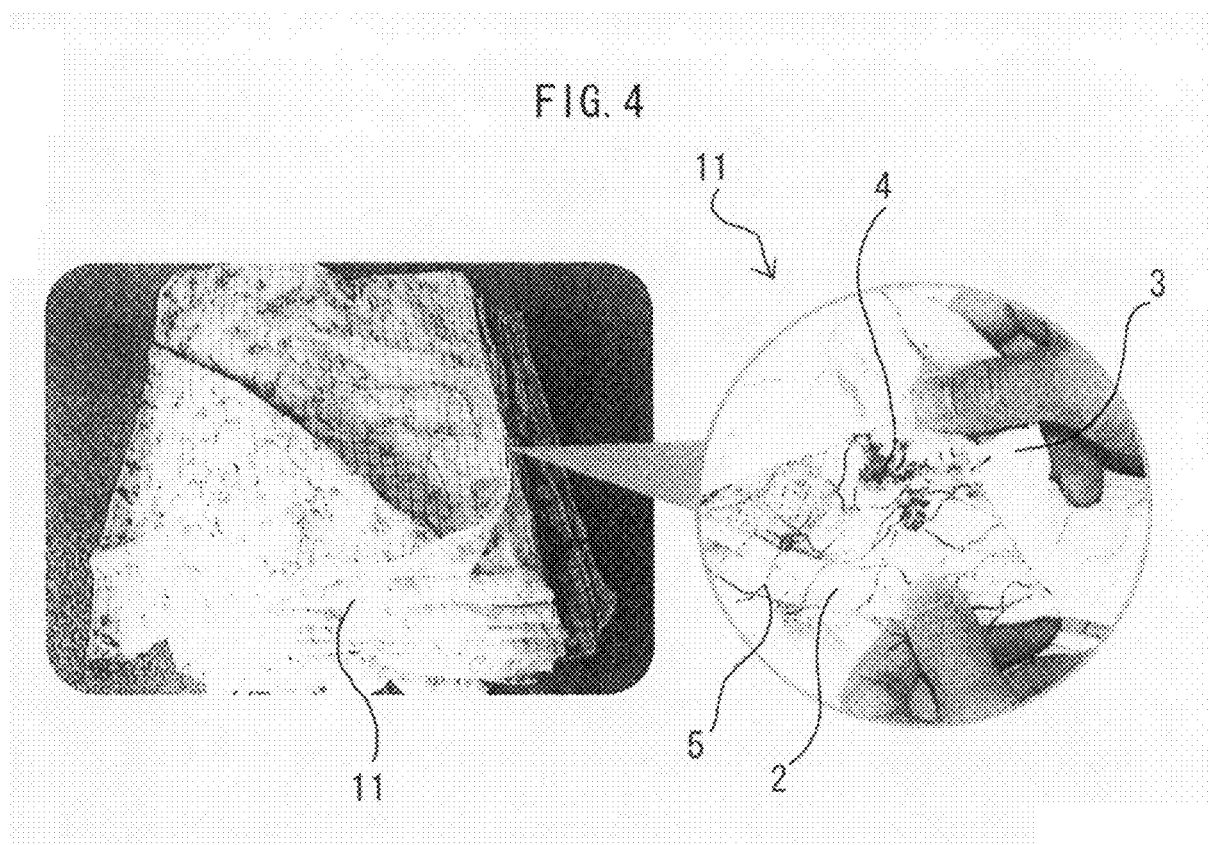
FIG. 4 is a perspective illustration showing a plant sheet according to another embodiment of the invention.

As a modified embodiment, a plant sheet 11 may contain a net 5 placed between the top sheet 3 and the base sheet 2 for supporting the plant pieces 4 as shown in FIG. 4. The net 5 has a function to support the plant pieces 4 in a case that the plant sheet 1 is set on a slope. Without such a net, the plant pieces 4 may be moved to a lower portion between the top sheet 3 and the base sheet 2 at a time of raining according to the force of gravity. Where the net 5 is placed between the top sheet 3 and the base sheet 2, the mesh of the net 5 is engaged with each plant pieces 4, so that each plant piece 4 can be immobilized between the top sheet 3 and the base sheet 2 and is prevented from positionally shifting due to the force of gravity. The net 5 has relatively large eyes so that the leaves and stems of the plant pieces 4 readily engage with the net 5. A preferred net 5 has a light weight and may be bio-degradable but more durable than the top sheet 3 and the base sheet 2. The material of the net 5 in the plant sheet 11 can be corn fiber or any material that is biodegradable.

FIGS. 5(a) to 5(d) illustrate construction of the plant sheet 11 on a slope. FIG. 5(a) shows a slope 12. The slope 12 can be a concrete surface or rock wall extending along a road side. The plant sheet 11 is placed on the slope 12 as to spread on the surface of the slope as shown in FIG. 5(b). The base sheet 2 is placed to cover the slope surface, and the top sheet 3 appears as the top surface of the plant sheet 1I. After the plant sheet 11 is spread on the slope 12, water 13 in a shape of, e.g., mists is supplied over the plant sheet 11. With such water, the water-soluble resin material in the top sheet 3 is further dissolved to operate as a paste for the plant sheet 1I on the slope 12 to increase the adhering force between the slope surface and the plant sheet 11. Approximately a couple weeks later, the plant pieces 4 in the plant sheet 11 as shown in FIG. 5(d), make growth in absorbing a little amount of water and nutrients on the surface of the slope 12 and become plants 14.

Figure 6:
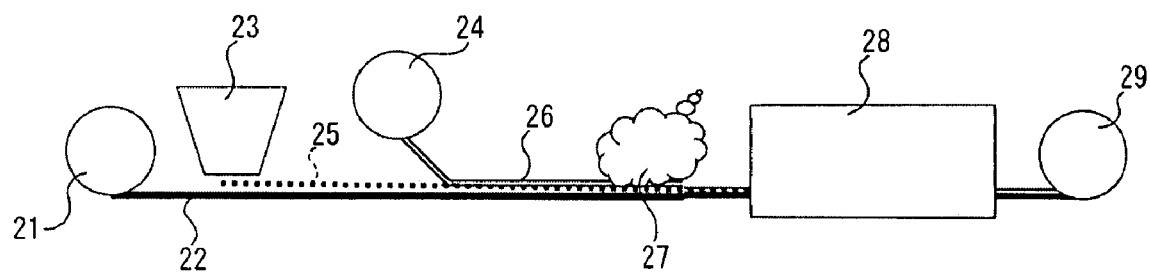
FIG. 6 is a diagram showing a manufacturing process for a plant sheet according to the invention.

FIG. 6 illustrates a manufacturing method for the invented plant sheet. The base sheet 22 is provided in a shape of a roll 21 at a starting point of the manufacturing process. From the roll 21, the base sheet 22 is pulled horizontally on a table, not shown, and plant pieces 25 are randomly placed on the base sheet 22 from a plant piece supplier 23 in an equally dispersed manner. If the plant pieces 25 are concentrated in one area, the operator of this manufacturing process can easily move the concentrated pieces to scanty areas.

After the plant pieces 25 are scattered on the base sheet 22, a top sheet 26 is supplied from a top sheet roll 24 as to overlap the plant pieces 25 and the base sheet 22. Where the top sheet 26 is closely in contact with the base sheet 22, water 27 is supplied to render the top sheet 26 wet. The water 27 can be supplied in a form of mists or showers. Where the top sheet 26 receives the water, the paste in the top sheet 26 is dissolved and comes out of the fibers, and the paste makes the top sheet 26 and the base sheet 22 adhering to each other, so that the plant pieces 25 located between the top sheet 26 and the base sheet 22 are firmly held by the top sheet 26 and the base sheet 22.

After the water 27 is supplied on the top sheet 26 to dissolve the water-soluble resin material in the top sheet 26, the top sheet 26 and the base sheet 22 are sent to a dryer 28. In the dryer 28, relatively hot air is blown to the surface of the top sheet 26 to dry the plant sheet. The dryer 28 extends to cover each sheet size in this embodiment, but if the plant sheet is sent successively to a delivery roll 29, the dryer 28 can be made compact.

Because the plant sheet can be readily folded, the manufactured plant sheet can be in a folded sheet form. When the plant sheet is in a folded state, the folded sheets can be stored in a stacking manner and handled with ease.

Figure 7:
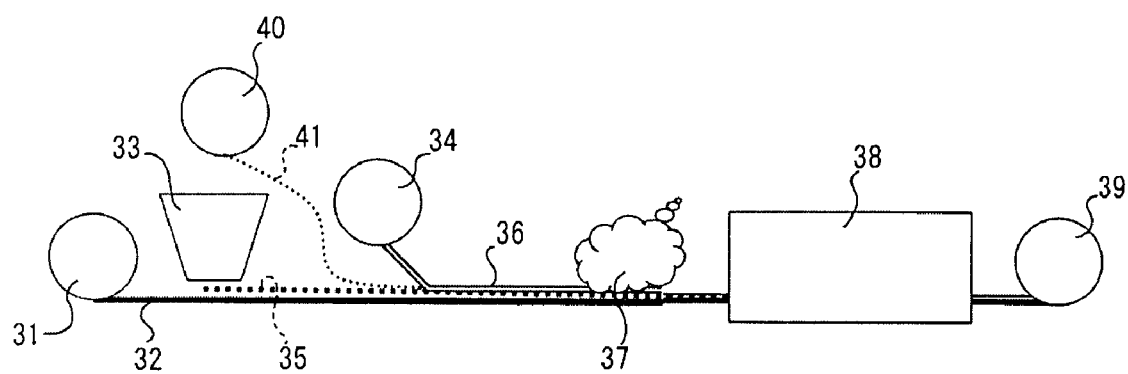
FIG. 7 is a diagram showing another manufacturing process for a plant sheet according to the invention.

FIG. 7 illustrates another manufacturing method for the invented plant sheet. The base sheet 32 is provided in a shape of a roll 31 at a starting point of the manufacturing process. From the roll 31, the base sheet 32 is pulled horizontally on a table, not shown, and plant pieces 35 are randomly placed on the base sheet 32 from a plant piece supplier 33 in an equally dispersed manner.

Before a top sheet 36 supplied from a top sheet supplier 34 is attached onto the base sheet 32, a net 41 is supplied to the surface of the base sheet 32. The net 41 prevents the plant pieces 35 from shifting their position, particularly on a slope by engaging with the leaves and stems of the plant pieces 35.

After the net 41 is supplied on the base sheet 32, a top sheet 36 is supplied from a top sheet roll 34 as to overlap the plant pieces 35 and the base sheet 32. Where the top sheet 36 is closely in contact with the base sheet 32, water 37 is supplied to render the top sheet 36 wet. Where the top sheet 36 receives the water, the paste in the top sheet 36 is dissolved and comes out of the fibers, and the paste makes the top sheet 36 and the base sheet 32 adhering to each other, so that the plant pieces 35 located between the top sheet 36 and the base sheet 32 are firmly held by the top sheet 36 and the base sheet 32.

The top sheet 36 and the base sheet 32 with the net 41 and the plant pieces 35 are then sent to a dryer 38. In the dryer 38, relatively hot air is blown on the surface of the top sheet 36 to dry the plant sheet, and the plant sheet is taken up at a delivery roller 39.

In the above manufacturing processes, the plant sheet is made in a form of a web or roll, but the plant sheet can be in a shape of a folded sheet or separated sheets, which are placed at the construction site in a tiling manner. Although in these embodiments, water is supplied after the top sheet is placed on the base sheet, water can be supplied to the top sheet before the top sheet is attached to the base sheet. In addition, to render the plant pieces adequately attached to the top sheet and the base sheet; the plant pieces may be made wet before being sandwiched between the top sheet and the base sheet.

FIGS. 8(a) to 8(c) illustrate the effects of apical dominance on a conventional plant sheet 51 in comparison to the plant sheet of the invention 52. FIG. 8(a) illustrates the growth of plant pieces 53 in a conventional plant sheet 51 in response to a light source 58. In the conventional plant growing methods, the plant pieces 53 are sowed on the base sheet, and the plant pieces 53 grow and raise their main central stem 55 having the terminal bud 54 rise upward toward the light source 58 (e.g. sun light, electric light, and the like) due to apical dominance. Therefore, only the main central stem 55 grows dominantly, and only the plant pieces 53 that have successfully rooted in the base sheet can grow because most of the plant pieces leave the base sheet except the roots.

FIG. 8(b) illustrates the growth of plant pieces 53 in the plant sheet of the invention 52 in response to a light source 58. In this embodiment, the plant sheet of the invention 52 contains a top sheet composed of a water-soluble resin material and a water-insoluble fiber. Upon addition of water to the top sheet, the water-soluble resin material will dissolve and form a paste that adheres to the base sheet and the top sheet.

FIG. 8(c), a magnified version of the left portion of FIG. 8(b), illustrates the ability of the plant sheet of the present invention to suppress apical dominance and allow emergence of side stems 57 for greater plant growth. After dissolution of the water-soluble resin material in the top sheet, the remaining water-insoluble fiber 56 of the top sheet, although not visible to the naked eye, secures the plant pieces 53 and main central stem 55 to prevent the terminal bud 54 from rising upward, thereby suppressing the apical dominance and allowing all the side stems 57 to grow and rise upward. The plant sheet of the invention 52 differs from the conventional methods, as the conventional methods allow only the main central stem 55 to grow dominantly due to the apical dominance. Therefore, the plant sheet of the present invention 52 grows and spreads the plant thrice to ten times faster than the conventional methods that cannot suppress the apical dominance. Furthermore, the water-insoluble fiber increases the number of taking roots and results in a much higher plant surviving rate because the water-insoluble fiber 56 holds the plant pieces on the base sheet after dissolution of the water-soluble resin material.

In this embodiment, the top sheet of the plant sheet 52 is a nonwoven fabric. More specifically, the top sheet is made of a water-soluble resin material and a water-insoluble fiber. The water-soluble resin material can be PVA and the water-insoluble fiber can be rayon. Alternatively, the top sheet of the plant sheet 52 is made of a water-soluble resin material, such as PVA and a water-insoluble fiber, such as a polymer, instead of rayon, wherein the polymer is selected from the group consisting of poly(D-lactic acid), poly(L-lactic acid), a D-lactic acid-L-lactic acid copolymer, a D-lactic acid-hydroxycarboxylic acid copolymer, and a blend of two or more polymers.

In another embodiment, the top sheet of the plant sheet 52 can be made of a water-soluble resin material, such as PVA, a water-insoluble fiber, such as rayon, and a water-insoluble polymer selected from the group consisting of poly(D-lactic acid), poly(L-lactic acid), a D-lactic acid-L-lactic acid copolymer, a D-lactic acid-hydroxycarboxylic acid copolymer, and a blend of two or more polymers.

In each of the above embodiments of the top sheet of the plant sheet 52, the water-soluble resin material acts as a paste when the top sheet is placed on the base sheet and water is supplied over the top sheet during the manufacturing process of the plant sheet 52, in a manner so that the base sheet adheres to the top sheet, securing them together with direct contact there between.

The weight percent range of the water-soluble fiber in the top sheet, such as PVA, is from about 50% to about 90%, preferably 70% and the weight percent range of the water-insoluble fiber, such as rayon or polymer, is from about 10% to about 50%, preferably 30%. In the instance where rayon and polymers are utilized in combination as water-insoluble fibers in the top sheet, the weight percent range of the polymer is from about 1% to about 50%.

Preferably, the weight percent ratio of PVA to rayon in the top sheet is about 70% PVA to about 30% rayon, such as Kuralon K-II manufactured and sold by Kuraray Co., Ltd; although this ratio may vary depending on the size, number and species of plant pieces 53 contained in the plant sheet 52. The areal weight of the top sheet, or the mass per unit area of a single ply of fabric, is in the range of from about 20 g/m$^2$ to about 40 g/m$^2$, preferably 30 g/m$^2$ in order to hold the plant pieces to suppress the apical dominance as well as allowing the plant pieces to easily tear the top sheet during growth.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A plant sheet for cultivating plant growth on a rigid surface from plant pieces without the requirement of seed comprising:
   a base sheet made of a naturally dissolvable gauze having a mesh structure so extending on said rigid surface as to adhere to said rigid surface;
   a plurality of root-forming leaf and stem plant pieces that are randomly placed on said base sheet in a dispersed manner to provide open areas at which none of said plant pieces exist, said open areas permitting absorption of water on said base sheet; and
   a tearable, water-soluble and biodegradable top sheet having a mesh structure that is placed on said base sheet and said plant pieces, wherein said top sheet contacts and adheres to said base sheet at said open areas with a water-soluble resin material, contacts the surfaces of said plant pieces to directly hold said plant pieces on said base sheet and comprises a water-soluble resin material and a water-insoluble fiber, wherein said water-insoluble fiber secures said plant pieces to said base sheet and comprises rayon.

2. The plant sheet according to claim 1, wherein a biodegradable net is placed between said top sheet and said base sheet to anchor and directly hold said plant pieces on said base sheet.

3. The plant sheet according to claim 1, wherein said base sheet is a paper material.

4. The plant sheet according to claim 1, wherein said top sheet is a nonwoven cloth.

5. The plant sheet according to claim 1, wherein said top sheet includes a biodegradable paper material.

6. The plant sheet according to claim 1, wherein said water-soluble resin material is polyvinyl alcohol.

7. The plant sheet according to claim 1, wherein the weight percent range of said water-soluble resin material is from about 50% to about 90%.

8. The plant sheet according to claim 1, wherein the weight percent of said water-soluble resin material is about 70%.

9. The plant sheet according to claim 1, wherein the weight percent range of said water-insoluble fiber is from about 10% to about 50%.

10. The plant sheet according to claim 1, wherein the weight percent of said water-insoluble fiber is about 30%.

11. The plant sheet according to claim 1, wherein the weight percent ratio of said water-soluble resin material to said water-insoluble fiber is about 70% to about 30%.

12. The plant sheet according to claim 1, wherein the areal weight range of the top sheet is from about 20 g/m$^2$ to about 40 g/m$^2$.

13. The plant sheet according to claim 1, wherein the areal weight of the top sheet is about 30 g/m$^2$.

14. The plant sheet according to claim 1, wherein the plant pieces are of one or more succulent plants, one or more cacti, or a combination of succulent plants and cacti.

15. The plant sheet according to claim 1, wherein said plant pieces include one or more sedums.

16. The plant sheet according to claim 1, wherein said plant sheet has a weight of 35 kg/m$^2$ or less.

17. The plant sheet according to claim 1, wherein said water-insoluble fiber further comprises at least one ingredient selected from the group consisting of poly(D-lactic acid), poly(L-lactic acid), a D-lactic acid-L-lactic acid copolymer, a D-lactic acid-hydroxycarboxylic acid copolymer, and a blend of two or more said ingredients.

18. The polymers according to claim 17, wherein the weight percent range of said polymer is from about 1% to about 50%.

19. A plant sheet for cultivating plant growth on a rigid surface from plant pieces without the requirement of seed comprising:
   a base sheet made of a naturally dissolvable gauze having a mesh structure so extending on said rigid surface as to adhere to said rigid surface;
   a plurality of root-forming leaf and stem plant pieces that are randomly placed on said base sheet in a dispersed manner to provide open areas at which none of said plant pieces exist, said open areas permitting absorption of water on said base sheet; and
   a tearable, water-soluble and biodegradable top sheet having a mesh structure that is placed on said base sheet and said plant pieces, wherein said top sheet contacts and adheres to said base sheet at said open areas with a water-soluble resin material, contacts the surfaces of said plant pieces to directly hold said plant pieces on said base sheet and comprises a water-soluble resin material and a water-insoluble fiber, wherein said water-insoluble fiber secures said plant pieces to said base sheet and comprises at least one ingredient selected from the group consisting of poly(D-lactic acid), poly(L-lactic acid), a D-lactic acid-L-lactic acid copolymer, a D-lactic acid-hydroxycarboxylic acid copolymer, and a blend of two or more said ingredients.

20. A method for manufacturing a plant sheet comprising the steps of:
   preparing a base sheet as to spread on a work table;
   placing a plurality of root-forming leaf and stem plant pieces randomly on said base sheet to provide open areas at which none of said plant pieces exist, said open areas permitting absorption of water on said base sheet;
   overlaying a top sheet on said base sheet contacting the surfaces of said plant pieces;
   applying water on said top sheet to dissolve the water-soluble resin material contained in said top sheet;
   drying the water contained at said top sheet and said base sheet,
      wherein said top sheet contacts and adheres to said base sheet at said open areas with said water-soluble resin material produced by the addition of water to said water-soluble resin material, contacts the surfaces of said plant pieces to directly hold said plant pieces on said base sheet and comprises a water-soluble resin material and a water-insoluble fiber, wherein said water-insoluble fiber secures said plant pieces to said base sheet and comprises rayon.

21. The method of manufacturing a plant sheet according to claim 20, further comprising the step of placing a net on said base sheet to anchor said plant pieces to said base sheet before overlaying the top sheet.

22. The method of manufacturing a plant sheet according to claim 20, wherein said top sheet and said base sheet are provided in a form of rolls.

23. The method of manufacturing a plant sheet according to claim 20, wherein said top sheet is made of a tearable sheet having a mesh structure, and the base sheet is made of a naturally dissolvable fabric having a mesh structure.

24. The method of manufacturing a plant sheet according to claim 20, wherein the plant pieces are of one or more succulent plants, one or more cacti, or a combination of succulent plants and cacti.

25. The method of manufacturing a plant sheet according to claim 20, wherein the plant pieces include one or more sedums.

* * * * *